United States Patent
Yun

(10) Patent No.: US 11,330,672 B2
(45) Date of Patent: May 10, 2022

(54) METHOD AND SYSTEM OF CONTROLLING HEAT WIRE OF SEAT

(71) Applicants: HYUNDAI MOTOR COMPANY, Seoul (KR); KIA MOTORS CORPORATION, Seoul (KR)

(72) Inventor: Hyun Chul Yun, Seoul (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 585 days.

(21) Appl. No.: 16/197,796

(22) Filed: Nov. 21, 2018

(65) Prior Publication Data

US 2020/0068660 A1 Feb. 27, 2020

(30) Foreign Application Priority Data

Aug. 27, 2018 (KR) ........................ 10-2018-0100209

(51) Int. Cl.
*H05B 1/02* (2006.01)
*B60N 2/56* (2006.01)
*A47C 7/74* (2006.01)

(52) U.S. Cl.
CPC ......... *H05B 1/0238* (2013.01); *B60N 2/5685* (2013.01); *A47C 7/748* (2013.01)

(58) Field of Classification Search
CPC .... H05B 1/0238; H05B 3/042; B60N 2/5685; B60N 2/56; B60N 2/002; A47C 7/748
See application file for complete search history.

(56) References Cited

U.S. PATENT DOCUMENTS

| 2006/0175877 A1* | 8/2006 | Alionte ................ B60N 2/5635 297/180.14 |
| 2018/0257523 A1* | 9/2018 | Dacosta-Mallet ... B60N 2/5621 |

FOREIGN PATENT DOCUMENTS

| KR | 10-2015-0092583 | * | 8/2015 |
| KR | 10-2018-0056214 A | | 5/2018 |

* cited by examiner

*Primary Examiner* — Shawntina T Fuqua
(74) *Attorney, Agent, or Firm* — Morgan, Lewis & Bockius LLP

(57) ABSTRACT

A method of controlling a heat wire of a seat includes: a classification operation of determining whether or not a passenger rides on a vehicle; a calculation operation of calculating a difference with a target temperature by measuring a current temperature of the seat; and a heating operation of heating the heat wire of the seat by differently setting a heating rate so that the temperature of the seat reaches the target temperature up to a heating target time set differently depending on whether or not the passenger rides on the vehicle.

8 Claims, 6 Drawing Sheets

METHOD AND SYSTEM OF CONTROLLING HEAT WIRE OF SEAT

CROSS REFERENCE TO RELATED APPLICATION

The present application claims priority to Korean Patent Application No. 10-2018-0100209, filed Aug. 27, 2018, the entire contents of which is incorporated herein for all purposes by this reference.

TECHNICAL FIELD

The present disclosure relates to a method and system of controlling a heat wire of a seat, and more particularly, to a method and system of controlling a heat wire of a seat for preheating the seat of a vehicle.

BACKGROUND

In winter, a considerable amount of time is needed to raise a temperature of a cold seat to a comfortable level even if a heater for heating the seat is operated.

Therefore, there has been used a method in which a heat wire capable of preheating the seat itself is installed so as to provide a comfortable feeling to a passenger more quickly and the temperature of the seat in contact with a body of the passenger is raised by operating the heat wire.

The conventional method of controlling a heat wire of a seat was to set a target temperature and to operate the heat wire of the sheet at a constant output until the seat reaches the target temperature. When such a method is used, the time at which the seat reaches the target temperature differs according to an external temperature, and the time needed until the passenger feels the comfortable feeling varies continuously.

Accordingly, in the case of cold weather, a long time is required for the seat to be heated to an appropriate temperature, and therefore, there is a problem that merchantability is deteriorated.

In addition, since an output of the heat wire of the seat is the same when the passenger operates the heat wire while riding on the vehicle and when the passenger wirelessly controls the heat wire by a wireless remote controller, there was also a problem that the seat is heated at unnecessarily high speed in a situation in which the passenger does not ride on the vehicle.

Therefore, there is a need for a new method of controlling a heat wire of a seat capable of rapidly raising the temperature of the seat to the target temperature as compared with the conventional method and preventing unnecessary fuel consumption by adjusting a heating rate during the wireless controlling of the heat wire of the seat.

The contents described as the related art have been provided only to assist in understanding the background of the present disclosure and should not be considered as corresponding to the related art known to those having ordinary skill in the art.

SUMMARY

An object of the present disclosure is to provide a method and system of controlling a heat wire of a seat capable of heating a temperature of the seat to a target temperature at the same time point regardless of an external temperature and performing a control so as to lower a heating rate during a wireless operation of the heat wire of the seat.

According to an embodiment of the present disclosure, a method of controlling a heat wire of a seat includes: a classification operation of determining whether or not a passenger rides on a vehicle; a calculation operation of calculating a difference with a target temperature by measuring a current temperature of the seat; and a heating operation of heating the heat wire of the seat by differently setting a heating rate so that the temperature of the seat reaches the target temperature up to a heating target time set differently depending on whether or not the passenger rides on the vehicle.

The method may further include, before the classification operation, a starting operation of receiving an operation signal of the heat wire of the seat and setting the target temperature.

In the starting operation, the operation signal may be generated through a heat wire switch which is physically connected to the seat, or the operation signal may be wirelessly generated, and in the classification operation, when the operation signal is generated through the heat wire switch, it may be determined that the passenger rides on the vehicle, and when the operation signal is wirelessly generated, it may be determined that the passenger does not ride on the vehicle.

In the starting operation, the target temperature may be set by selecting one of a plurality of modes having different target temperatures.

The method may further include, before the classification operation, an ignition operation of confirming whether or not an engine is ignited, wherein the classification operation may not be performed in a state in which the engine is not ignited.

When the passenger rides on the vehicle during the heating operation after it is determined that the passenger does not ride on the vehicle in the classification operation, the heating rate may be changed to another heating rate used in a case in which it is determined that the passenger rides on the vehicle in the classification operation.

When a FOB key of the passenger is connected to the vehicle during the heating operation, it may be determined that the passenger rides on the vehicle.

The heating rate in the heating operation when it is determined that the passenger does not ride on the vehicle in the classification operation may be set to be lower than the heating rate in the heating operation when it is determined that the passenger rides on the vehicle in the classification operation.

According to another embodiment of the present disclosure, a system of controlling a heat wire of a seat includes: a seat including a heat wire; a riding determining device determining whether or not a passenger rides on a vehicle; a temperature sensor measuring a current temperature of the seat; and a controller calculating a difference between the measured current temperature of the seat and a target temperature and heating the heat wire of the seat by differently setting a heating rate so that the temperature of the seat reaches the target temperature up to a heating target time set differently depending on whether or not the passenger rides on the vehicle.

DETAILED DESCRIPTION

Special terms used in the present specification are used only in order to describe specific embodiments rather than limiting the present disclosure. Singular forms used herein are intended to include plural forms unless explicitly indicated otherwise. It will be further understood that the terms "comprises" used in this specification, specify stated features, regions, integers, steps, operations, components, and/or parts, but do not preclude the presence or addition of other stated features, regions, integers, steps, operations, components, and/or parts.

Unless indicated otherwise, it is to be understood that all the terms used in the specification including technical and scientific terms has the same meaning as those that are understood by those skilled in the art. It must be understood that the terms defined by the dictionary are identical with the meanings within the context of the related art, and they should not be ideally or excessively formally defined unless the context clearly dictates otherwise.

Hereinafter, a method of controlling a heat wire of a seat according to exemplary embodiments of the present disclosure will be described with reference to the accompanying drawings.

Figure 1:
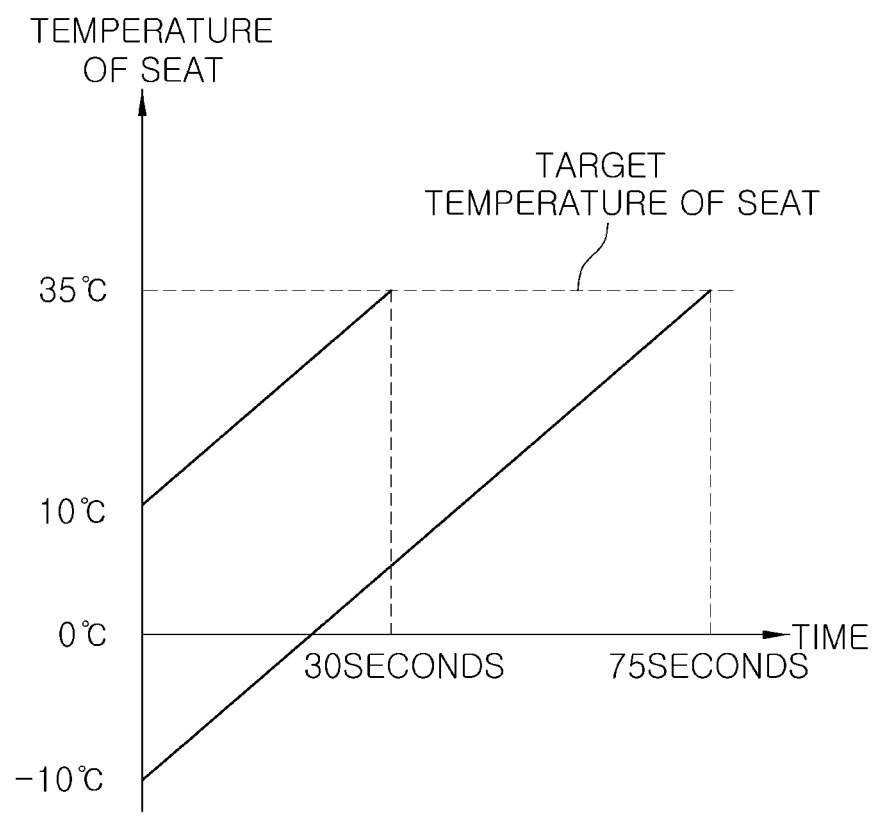
FIG. 1 is a graph illustrating the degree of temperature rise with time when a seat is heated using a conventional method of controlling a heat wire of a seat.
Figure 2:
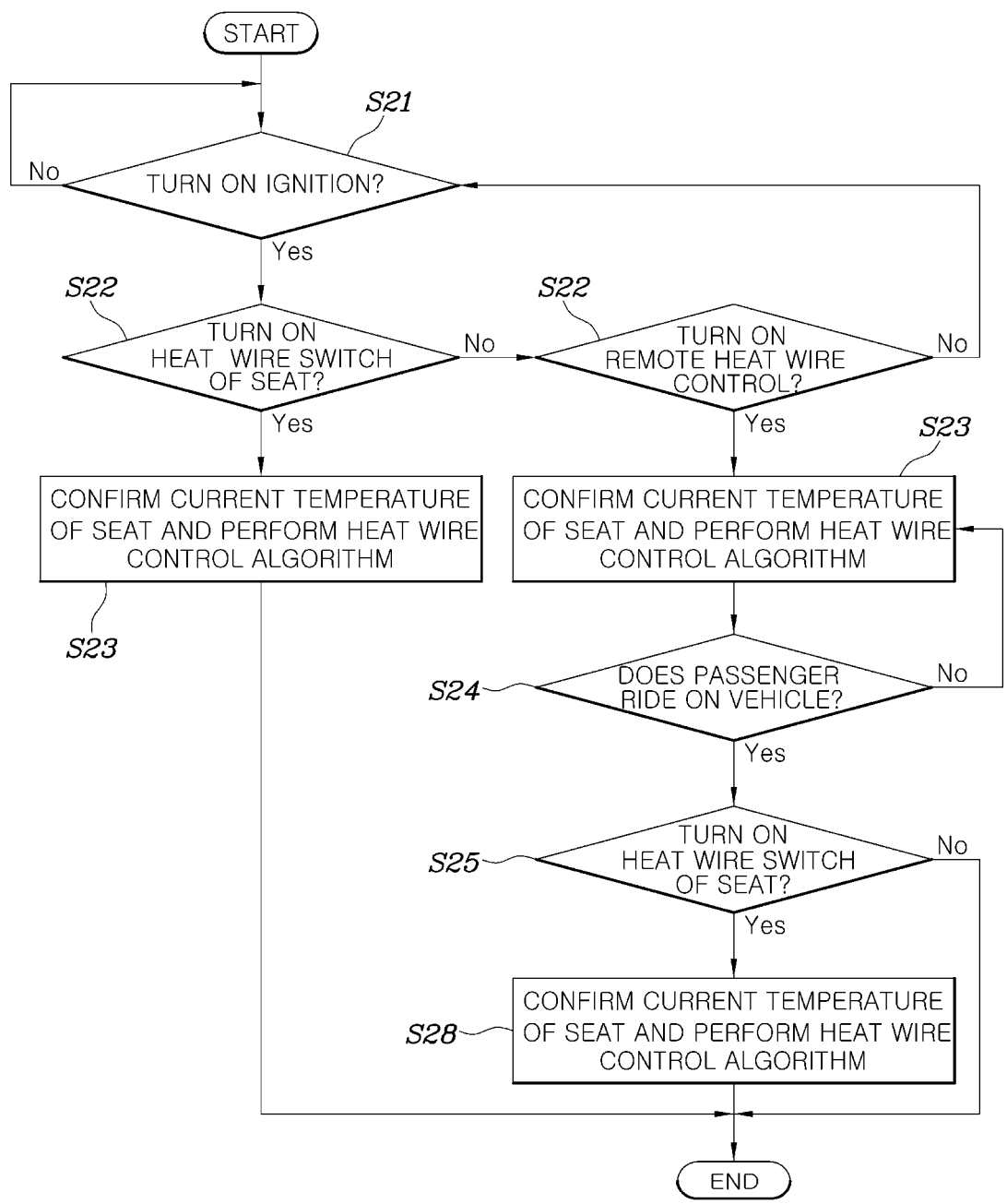
FIG. 2 is a flowchart of a method of controlling a heat wire of a seat according to an embodiment of the present disclosure.
Figure 3:
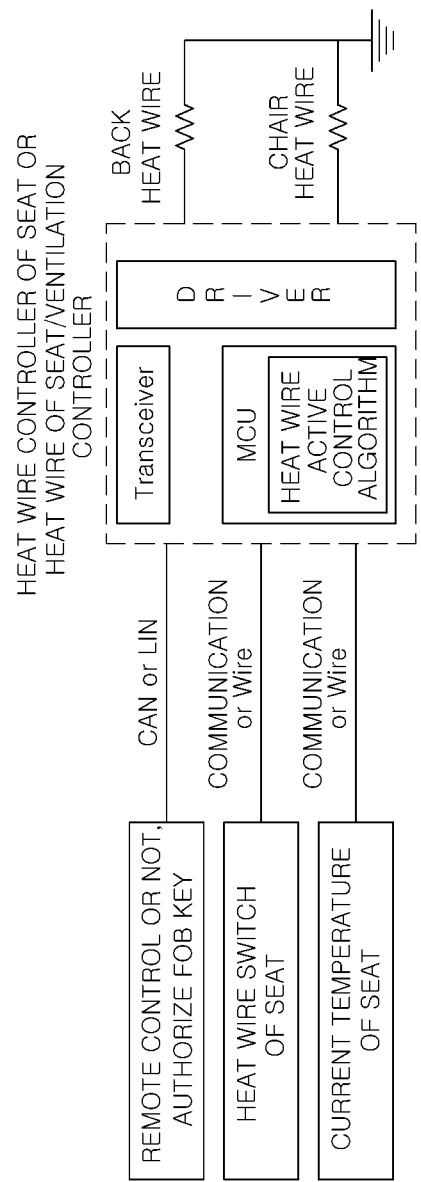
FIG. 3 is a block diagram schematically illustrating components that operate according to the method of controlling a heat wire of a seat according to an embodiment of the present disclosure.
Figure 4:
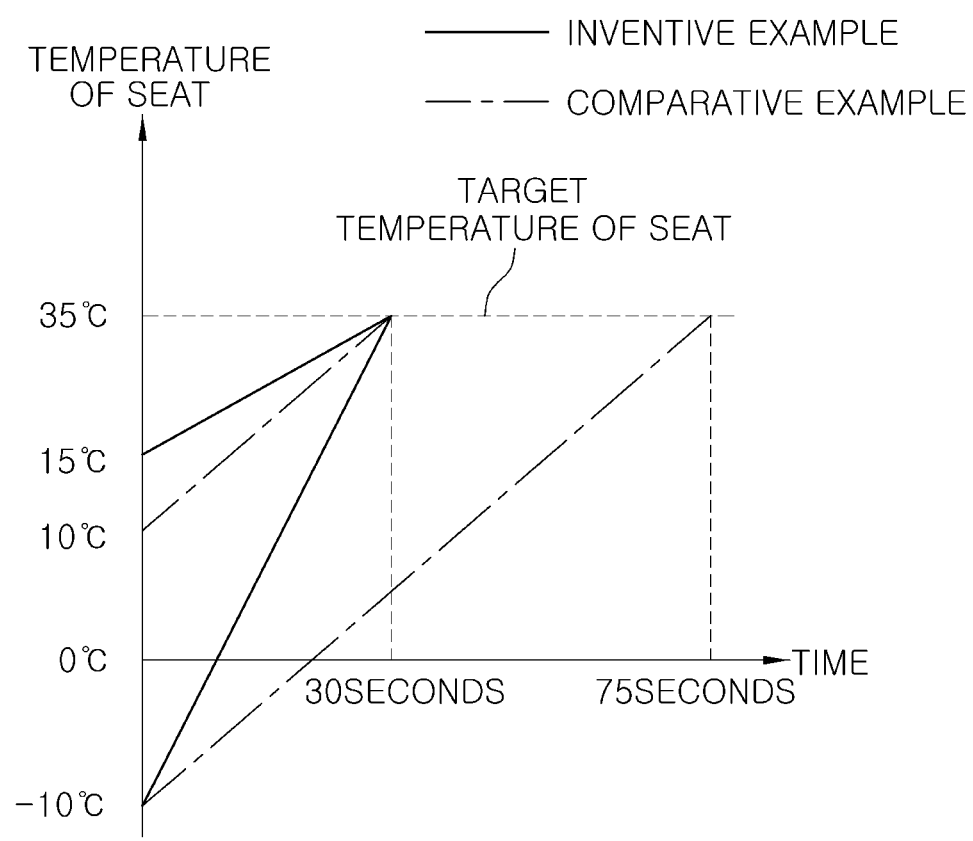
FIG. 4 is a graph illustrating the degree of temperature rise with time when a seat is heated using the method of controlling a heat wire of a seat according to an embodiment of the present disclosure.
Figure 5:
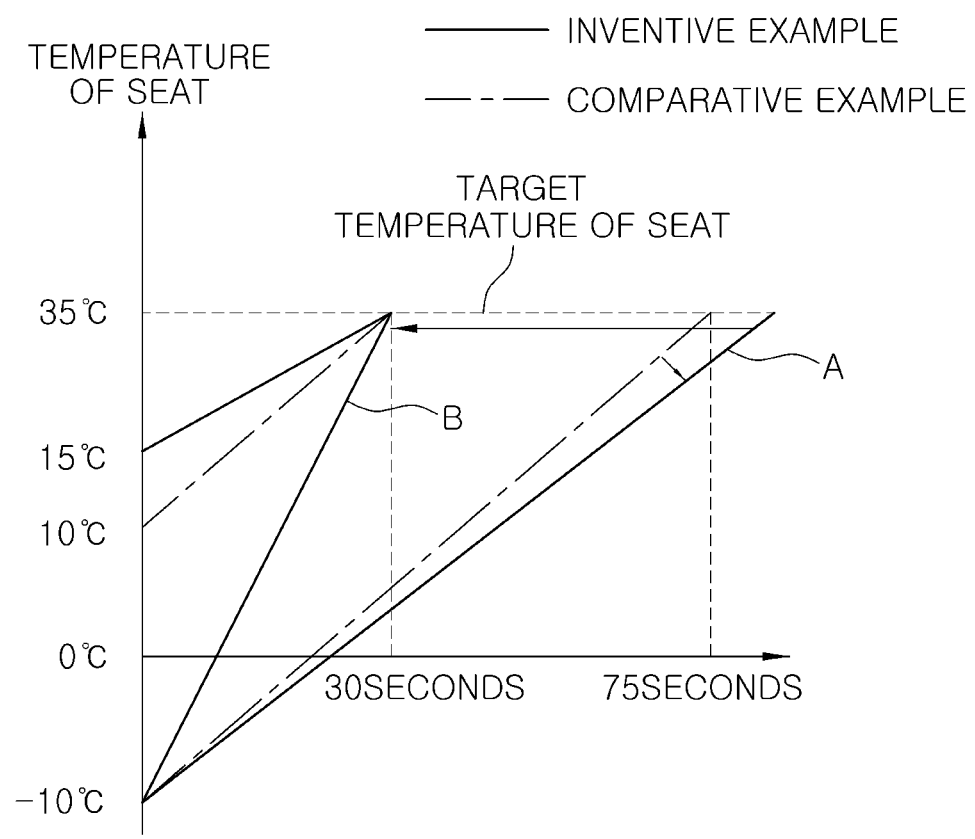
FIG. 5 is a graph illustrating the degree of temperature rise with time when a seat is heated using a method of controlling a heat wire of a seat according to another embodiment of the present disclosure.

FIG. 1 is a graph illustrating the degree of temperature rise with time when a seat is heated using a conventional method of controlling a heat wire of a seat, FIG. 2 is a flowchart of a method of controlling a heat wire of a seat according to an embodiment of the present disclosure, FIG. 3 is a block diagram schematically illustrating components that operate according to the method of controlling a heat wire of a seat according to an embodiment of the present disclosure, FIG. 4 is a graph illustrating the degree of temperature rise with time when a seat is heated using the method of controlling a heat wire of a seat according to an embodiment of the present disclosure, and FIG. 5 is a graph illustrating the degree of temperature rise with time when a seat is heated using a method of controlling a heat wire of a seat according to another embodiment of the present disclosure.

As illustrated in FIGS. 2 and 3, a method of controlling a heat wire of a seat according to the present disclosure includes a classification operation of determining whether or not a passenger rides on a vehicle, a calculation operation of calculating a difference with a target temperature by measuring a current temperature of the seat, and a heating operation of heating the heat wire of the seat by differently setting a heating rate so that the temperature of the seat may reach the target temperature up to a heating target time set differently depending on whether or not the passenger rides on the vehicle.

Additionally, the method of controlling a heat wire of a seat according to the present disclosure preferably further includes an ignition operation of confirming whether or not an engine is ignited (S21) and a starting operation of receiving an operation signal of the heat wire of the seat and setting the target temperature, before the classification operation.

In the ignition operation (S21), it is confirmed whether or not the engine is in an ignited state. In a state in which the engine is not ignited, a control may be performed so that the classification operation and the subsequent operations are not performed.

A large amount of power is required to heat the heat wire of the seat. Therefore, when the heat wire of the seat is heated only by the power of a battery in the state in which the engine is not ignited, the battery may be discharged rapidly. Therefore, an operation of confirming that the engine is ignited before heating the heat wire of the seat is to protect the battery.

The starting operation is an operation of receiving a command for heating the heat wire of the seat, after it is confirmed that the engine is in an ignited state. The starting operation is an operation of generating an operation signal through a heat wire switch which is connected to the seat through wire or wirelessly generating the operation signal.

The heat wire switch may be, for example, installed directly on the seat, or installed on a dashboard. In order to wirelessly generate the operation signal, a remote operation button may be installed on, for example, a wireless FOB key, or the like.

In such a starting operation, the target temperature may be set by selecting one of a plurality of modes having different target temperatures. For example, three modes (stages) are prepared. In a first stage, the target temperature is set to 35° C., in the second stage, the target temperature is set to 40° C., and in the third stage, the target temperature is set to 50° C. The number of the stages or the target temperature for each stage are not limited to this example, and may vary depending on the shape and size of the seat, the type of vehicle, and the like, and may also be adjusted by a setting of a user.

In the classification operation, when the operation signal to turn on the heat wire of the seat is generated through the heat wire switch (yes in S22), it may be determined that the passenger rides on the vehicle. On the other hand, when the operation signal to turn on the heat wire of the seat is remotely generated and wireless received (yes in S23), it may be determined that the passenger does not ride on the vehicle.

That is, when the heat wire switch which is directly connected to the seat or installed on the dashboard is operated, it may be determined that the passenger sits on the seat and directly operates the heat wire of the seat (yes in S22). On the other hand, when the heat wire is wirelessly operated using an application (e.g., Bluelink) for remote control (yes in S23), it may be determined that the passenger is out of the vehicle.

When a current position of the passenger is determined in the classification operation as described above, the heating rate of the heat wire of the seat may be differently controlled in the heating operation to be described below. For example, when the passenger is inside the vehicle, the seat may be heated more quickly to reach the target temperature in a short time (S23), and when the passenger is out of the vehicle, the heating rate of the seat may be adjusted relatively slowly (S24), thereby reducing power consumption.

In the heating operation, the temperature of the seat is raised by substantially heating the heat wire of the seat. In this case, the heating rate of raising the temperature of the seat by heating the heat wire of the seat is varied depending on an external temperature and whether or not the passenger rides on the vehicle in the classification operation.

That is, in order to reach the target temperature in a certain time, as the external temperature is low, the heating rate is increased, and in the state in which the passenger does not ride on the vehicle, the heating rate is decreased, thereby reducing the power consumption.

As illustrated in FIG. 1, according to the related art, the heating rate is constant regardless of the external temperature. For example, when the external temperature was minus 10° C., it took about 75 seconds to heat up to 35° C. and when the external temperature was 10° C., it took about 30 seconds to heat up to 35° C.

However, in the case of using the method of controlling the heat wire of the seat according to the present disclosure, as illustrated in FIG. 4, the heating rate is variably adjusted so that the target temperature may be reached in a predetermined time, for example, 30 seconds, when the heat wire is operated by the heat wire switch which is directly connected to the seat or installed on the dashboard.

That is, the heating rate is controlled differentially according to the external temperature so that the time to be heated to up to 35° C. becomes equal to 30 seconds when the external temperature is minus 10° C. or 15° C.

As a result, it may easily know the time when the seat is heated to a proper temperature after the passenger operates the heat wire of the seat, thereby increasing merchantability.

Meanwhile, as illustrated in FIG. 5, when the heat wire is operated by remote control using the FOB key or the like, the seat is heated at a lower heating rate as indicated by line A in FIG. 5.

In general, when the vehicle parked outside of the house is remotely ignited by the driver in the house through the FOB or an application, the driver will usually ride on the vehicle between about 5 and 10 minutes after the ignition. Therefore, in a case in which the temperature of the seat is rapidly raised by operating the heat wire of the seat at a high output, unnecessary power is consumed in a state in which the passenger does not ride on the vehicle and power for maintaining the temperature of the seat is additionally consumed.

Therefore, when the heat wire of the seat is operated remotely in the state in which the passenger does not ride on the vehicle, the heating rate is lowered as indicated by line A in FIG. 5, thereby minimizing the consumption of the battery.

In addition, there may be a case in which the driver rides on the vehicle while the seat is heated by operating the heat wire of the seat through the remote operation in the state in which the driver does not ride on the vehicle.

In this case, by sensing the riding of the driver and raising the output of the heat wire of the seat, the temperature of the seat may be raised rapidly to the target temperature such that the driver may feel comfort feeling quickly.

For example, after the seat is heated at a lower heating rate as indicated by line A in FIG. 5 initiated by a remote control through the FOB key or the like (yes in S25), when the driver rides on the vehicle (yes in S26) while the driver operates the heat wire of the seat through the remote control (yes in S27) and the temperature of the seat is heated along the line A in FIG. 5, the heating rate of the seat is changed to line B in FIG. 5 and the heating is rapidly completed by perform an operation S28.

An example of a method of recognizing whether the driver rides on the vehicle includes recognizing an approach of the driver by sensing the FOB key through lower frequency (LF) radio waves in the vehicle, or operating the heat wire switch of the seat installed on the seat or the dashboard by the driver who directly rides on the vehicle.

Figure 6:
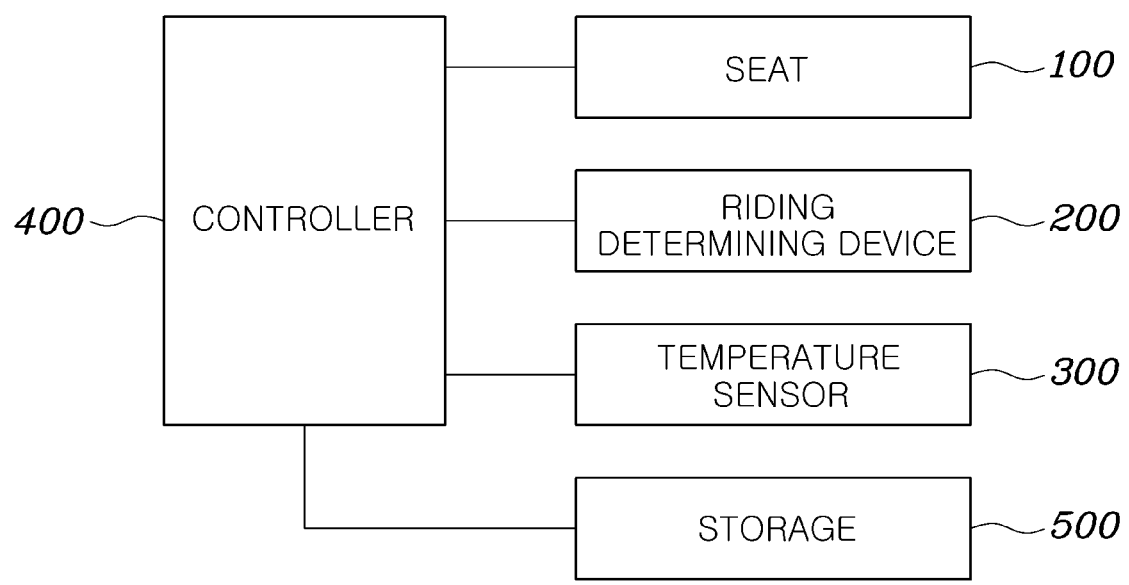
FIG. 6 is a block diagram illustrating components of a system of controlling a heat wire of a seat according to an embodiment of the present disclosure.

FIG. 6 is a block diagram illustrating components of a system of controlling a heat wire of a seat according to an embodiment of the present disclosure. As illustrated in FIG. 6, a system of controlling a heat wire of a seat according to an embodiment of the present disclosure may include a seat 100 including a heat wire including back heat wire and/or a chair heat wire (shown in FIG. 3); a riding determining device 200 including, but not limited to, a weight sensor installed on the seat, determining whether or not a passenger rides on a vehicle; a temperature sensor 300 measuring a current temperature of the seat; and a controller 400 calculating a difference between the measured current temperature of the seat and a target temperature and heating the heat wire of the seat by differently setting a heating rate so that the temperature of the seat may reach the target temperature up to a heating target time set differently depending on whether or not the passenger rides on the vehicle. The controller 400 may correspond to the heat wire controller of the seat or the heat wire of the seat/ventilation controller shown in FIG. 3. The controller 400 may include a driver to apply electricity to the heat wire, a transceiver to communicate with the FOB key or a mobile device installed with an application (Bluelink), and a microcontroller (MCU) or a microprocessor (MCU) coupled with a storage 500 implemented at least with heat wire active control algorithm. The storage 500 may be a RAM, a flash memory, a ROM, an erasable and programmable ROM (EPROM), an electrically EPROM (EEPROM), a register, a hard disc, a removable disc, or a compact disc-ROM (CD-ROM). The storage 500 may be coupled to the controller 400. The controller 400 may read out information from the storage 500 and may write information in the storage 500. Alternatively, the storage may be integrated with the controller 400. The controller 400 and storage 500 may reside in an application specific integrated circuit (ASIC). The various embodiments disclosed herein can be implemented using one or more processors (included in the controller 400) having a memory storing computer-executable instructions for causing the processor(s) to perform the operations described above, or coupled to a memory (such as the storage 500) storing computer-executable instructions for causing the processor(s) to perform the operations described above.

Meanwhile, since features of detailed configurations of the system of controlling a heat wire of a seat according to an embodiment of the present disclosure are the same as the technical features of the method of controlling a heat wire of a seat described above, a detailed description thereof will be omitted.

According to the method and system of controlling a heat wire of a seat according to the present disclosure, the following effects may be obtained.

First, the seat may be rapidly heated to the target temperature regardless of the external temperature.

Second, unnecessary fuel consumption may be prevented by adjusting the output of the heat wire of the seat depending on whether or not the passenger rides on the vehicle.

Third, the number of charge and discharge of the battery and the amount of discharge of the battery are reduced by varying the output of the heat wire of the seat, thereby making it possible to increase the lifespan of the battery.

Although the embodiments of the present disclosure have been described with reference to the accompanying drawings, those skilled in the art will appreciate that various modifications and alterations may be made without departing from the spirit or essential feature of the present disclosure.

Therefore, it should be understood that the embodiments described above are not restrictive, but are exemplary in all aspects. It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A method of controlling a heat wire of a seat, the method comprising:
   a classification operation of determining whether or not a passenger rides on a vehicle;
   a calculation operation of calculating a difference with a target temperature by measuring a current temperature of the seat; and
   a heating operation of applying electricity to the heat wire of the seat to heat the seat from the current temperature to the target temperature at a first heating rate when the passenger rides on the vehicle and at a second heating rate lower than the first heating rate when the passenger does not ride on the vehicle.

2. The method of claim 1, the classification operation, further comprising: before the classification operation, a starting operation of receiving an operation signal of the heat wire of the seat and setting the target temperature.

3. The method of claim 2, wherein in the starting operation, the operation signal is generated through a heat wire switch which is connected to the seat through wire or the operation signal is wirelessly generated, and
   in the classification operation, when the operation signal is generated through the heat wire switch, it is determined that the passenger rides on the vehicle, and when the operation signal is wirelessly generated, it is determined that the passenger does not ride on the vehicle.

4. The method of claim 2, wherein in the starting operation, the target temperature is set by selecting one of a plurality of modes having different target temperatures.

5. The method of claim 1, further comprising: before the classification operation, an ignition operation of confirming whether or not an engine is ignited,
   wherein the classification operation is not performed in a state in which the engine is not ignited.

6. The method of claim 1, further comprising:
   after heating the seat at the second heating rate based on a previous determination that the passenger does not ride on the vehicle, changing a heating rate from the second heating rate to the first heating rate in response to a current determination that the passenger starts to ride on the vehicle.

7. The method of claim 6, wherein when a FOB key of the passenger is connected to the vehicle during the heating operation, it is determined that the passenger rides on the vehicle.

8. A system of controlling a heat wire of a seat, the system comprising:
   a seat including a heat wire;
   a riding determining device determining whether or not a passenger rides on a vehicle;
   a temperature sensor measuring a current temperature of the seat; and
   a controller calculating a difference between the current temperature of the seat and a target temperature, and applying electricity to the heat wire of the seat to heat the seat from the current temperature to the target temperature at a first heating rate when the passenger rides on the vehicle and at a second heating rate lower than the first heating rate when the passenger does not ride on the vehicle.

* * * * *

UNITED STATES PATENT AND TRADEMARK OFFICE
CERTIFICATE OF CORRECTION

PATENT NO. : 11,330,672 B2  
APPLICATION NO. : 16/197796  
DATED : May 10, 2022  
INVENTOR(S) : Hyun Chul Yun Page 1 of 1

It is certified that error appears in the above-identified patent and that said Letters Patent is hereby corrected as shown below:

On the Title Page

Item (73), delete "SAMSUNG ELECTRO-MECHANICS CO., LTD., Suwon-si, Gyeonggi-do (KR)" and insert -- HYUNDAI MOTOR COMPANY, Seoul (KR); KIA MOTORS CORPORATION, Seoul (KR) --

Signed and Sealed this  
Sixteenth Day of May, 2023

Katherine Kelly Vidal  
*Director of the United States Patent and Trademark Office*